UNITED STATES PATENT OFFICE.

JOSEPH WISEMAN, OF PHILADELPHIA, PENNSYLVANIA.

IMPROVEMENT IN FIRE AND WATER PROOF PAINT.

Specification forming part of Letters Patent No. 3,420, dated January 31, 1844.

*To all whom it may concern:*

Be it known that I, JOSEPH WISEMAN, of the city and county of Philadelphia, and State of Pennsylvania, have invented a new compound or pigment, which I denominate "Anti-Corrosive Indestructible Carbonic Paint;" and I do hereby declare that the following is a full, clear, and exact description thereof.

The nature of my invention consists in combining the metal of carbon or purified graphite with caoutchouc and shellac, together with a small portion of acetate or sugar of lead, the ingredients being mixed with linseed-oil and spirits of turpentine.

In making this pigment the ingredients are varied in their proportions according to the use to which it is to be applied—as, for instance, articles that are continually immersed in water, or alternately wet and dried, or that are exposed to the sun or the more intense heat of fire, receive a different coating. The carbon and other materials are put into a mill and ground, together with a small portion of the oil and turpentine, till they form a perfectly homogeneous mass. There is then more of the oil and turpentine added, and it is spread like paint upon the article to be coated with it. The wood absorbs the caoutchouc, &c., which are impervious and would of themselves render it less destructible than any other process; but when combined with the carbon—the most indestructible substance known in the mineral kingdom—the most perfect protection is afforded. Iron is also equally well preserved by it. When the pigment is exposed to heat less gum and more carbon are used, and vice versa.

This composition is intended to preserve wood, iron, &c., from decay or chemical decomposition when exposed to water, air, heat, or other destructive influences of greater or less intensity, the gums being absorbed by the substances to which the pigment is applied, with only enough left on the surface to attach the carbon and insure an almost purely metallic coating, which adheres to the subjacent surject with great tenacity.

What I claim as my invention, and desire to secure by Letters Patent, is—

The combination of carbon or pure graphite with caoutchouc and shellac, together with acetate of lead, linseed-oil, and spirits of turpentine, for the purpose herein set forth, forming a perfectly indestructible anti-corrosive pigment. It also serves the purposes of anti-attrition.

JOSEPH WISEMAN.

Witnesses:
J. J. GREENOUGH,
J. H. GODDARD.